United States Patent [19]
Wells et al.

[11] Patent Number: 5,554,341
[45] Date of Patent: Sep. 10, 1996

[54] FEED ZONE PERFORMANCE FOR A CAT CRACKER

[75] Inventors: Jan W. Wells, Bartlesville, Okla.; William H. Long, Jr., Sweeny; William J. Vedder, Sugarland, both of Tex.

[73] Assignee: Phillips Petroleum Company, Bartlesville, Okla.

[21] Appl. No.: 354,386

[22] Filed: Dec. 12, 1994

[51] Int. Cl.$^6$ .................................................. F27B 15/08
[52] U.S. Cl. ............................ 422/145; 208/55; 208/108; 208/113
[58] Field of Search ........................ 422/140, 144, 422/145; 585/923; 208/55, 108, 113

[56] References Cited

U.S. PATENT DOCUMENTS

| | | | |
|---|---|---|---|
| 4,097,243 | 6/1978 | Bartholic | 422/145 |
| 4,331,533 | 5/1982 | Dean et al. | 422/145 |
| 4,562,046 | 12/1985 | Hays et al. | 422/145 |
| 4,564,502 | 1/1986 | Skraba | 422/145 |
| 4,681,743 | 7/1987 | Skraba | 422/140 |
| 4,687,642 | 8/1987 | Nielson | 422/145 |
| 4,753,780 | 6/1988 | Bowen | 422/145 |
| 4,784,328 | 11/1988 | Skraba | 239/432 |
| 4,808,383 | 2/1989 | Buyan et al. | 422/145 |
| 5,053,203 | 10/1991 | Mauleon et al. | 422/145 |
| 5,174,889 | 12/1992 | Nielsen | 208/113 |
| 5,205,992 | 4/1993 | van Ommen et al. | 422/145 |
| 5,215,720 | 6/1993 | Cetinkaya | 422/144 |
| 5,288,920 | 2/1994 | Chan et al. | 422/145 |
| 5,298,155 | 3/1994 | Sabottke | 208/157 |

OTHER PUBLICATIONS

"Revamping Old FCCUs with 1994 Technology", AM-94-56, National Petroleum Refiners Association.
"Third Generation FCC Feed Injection Technology: Introduction of the ATOMAX™ Feed Nozzle", AM-94-55, National Petroleum Refiners Association.

*Primary Examiner*—Timothy McMahon
*Attorney, Agent, or Firm*—Gary L. Haag

[57] ABSTRACT

This invention concerns an apparatus and process for effectively contacting oil, catalyst, and a gas. This invention has specific applications in the design and operation of catalytic cracking units and specifically, the processing and upgrading of heavy oils to higher valued components.

54 Claims, 3 Drawing Sheets

FEED ZONE PERFORMANCE FOR A CAT CRACKER

BACKGROUND

In one aspect, the invention relates to a catalytic cracking unit. In another aspect, the invention relates to a catalytic cracking process.

In the petroleum refining industry, the fluidized catalytic cracking of hydrocarbons is well known and may be accomplished in a variety of processes which employ fluidized solid techniques. Normally in such processes, suitably preheated, relatively high molecular weight hydrocarbon liquids and/or vapors are contacted with hot, finely-divided, solid catalyst particles either in a fluidized bed reaction zone or in an elongated riser reaction zone, and maintained at an elevated temperature in a fluidized state for a period of time sufficient to effect the desired degree of cracking to lower molecular weight hydrocarbons typical of those present in motor gasolines and distillate fuels.

During the cracking reaction, coke is deposited on the catalyst particles in the reaction zone thereby reducing the activity of the catalyst for cracking and the selectivity of the catalyst for producing gasoline blending stock. In order to restore a portion, preferably a major portion, of the activity to the coke-contaminated or spent catalyst, the catalyst is transferred from the reaction zone into a regeneration zone. Typical regeneration zones comprise large vertical cylindrical vessels wherein the spent catalyst is maintained as a fluidized bed by the upward passage of an oxygen-containing regeneration gas, such as air, under conditions to burn at least a portion, preferably a major portion, of the coke from the catalyst. The regenerated catalyst is subsequently withdrawn from the regeneration zone and reintroduced into the reaction zone for reaction with additional hydrocarbon feed.

High boiling oils are difficult to catalytically crack to gasoline range product in existing catalytic cracking operations. There are several reasons for this. The deposition of large amounts of coke on the catalyst will frequently bring the unit up to its coke burning capacity. Coke precursors are more abundant in high boiling oils. Coke laydown is also caused by the deposition of metals on the cracking catalyst that increase the coking tendencies of the catalyst. The troublesome metals become concentrated in the high boiling oils. Coke laydown to a large extent is also influenced by poor vaporization of the oil prior to contact with the catalyst. High boiling oils are difficult to vaporize. Poor mixing between the cracking catalyst and oil feedstock also contributes to coke laydown on the catalyst, as poor mixing can lead to localized high catalyst:oil ratios and over cracking.

Heavy oils include heavy gas oils which generally boil from about 600° F. to 1200° F., and components such as topped crudes and residuum which frequently have an initial boiling point in excess of 850° F. and an end boiling point in excess of 1200° F. Generally speaking, heavy oils will have an initial boiling point in excess of 500° F. and a 90% overhead point in excess of 1000° F. Heavy gas oils and residuums are especially difficult to crack to valuable products because their boiling point makes satisfactory vaporization very difficult, their viscosity complicates handling and further complicates vaporization, the metal contaminant concentration for such oils is usually quite high, the hydrogen:carbon ratio is usually quite low and the concentration of carbon producing components such as polycyclic aromatics, asphaltenes and the like is usually very high. Feeds which contain components which have a boiling point in excess of 1050° F.+ are generally considered to be very poor fluid catalytic cracking feeds due to poor conversion to gasoline and lighter components, high coke production and excessive temperature levels in the regenerator.

Heavy oils can be successfully cracked to desirable products where they have been vaporized prior to contact with the catalyst and the catalyst:oil ratio is carefully controlled. With conventional feeds, vaporization is achieved by radiant energy transfer from the hot cracking catalyst to the feed droplets. This type of vaporization mechanism is satisfactory for oils boiling below thermal cracking temperatures which commence at about 850° F. For heavy oils, however, vaporization by radiant energy transfer is unsatisfactory due to the onset of thermal cracking and coke formation prior to complete vaporization of the liquid. Coke laydown is worsened where liquid oil strikes the hot catalyst particles. It would be clearly desirable to provide an apparatus and process to mitigate contact between not catalyst and liquid oil feed in a catalytic cracking unit.

Steam is frequently used to assist in dissociation of the oil feedstock. However, the use of steam in a catalytic cracking unit can quickly become quite expensive because of the amounts involved. The additional presence of steam apparently functions to lower the partial pressure of components thereby promoting vaporization of said components. Also, large amounts of steam deactivate the cracking catalyst and change conditions in the riser-reactor. It would be very desirable to avoid the use of large amounts of steam for feedstock dissociation in a cracking unit if possible.

SUMMARY OF THE INVENTION

It is an object of this invention to provide an improved mixing zone for catalyst and feedstock in a catalytic cracking unit.

It is a further object of this invention to provide a method for admixing hot cracking catalyst particles and liquid oil feedstock in a catalytic cracking unit.

It is a further object of this invention to provide an apparatus and method for cracking an oil feedstock in which usage of atomizing and fluidizing gas is an independent process variable.

In accordance with one embodiment of this present invention, an apparatus for cracking heavy oils has been discovered which provides a means for combining and effectively contacting oil, catalyst and gas thereby resulting in unexpected improvements in cracking efficiencies and throughputs.

In another embodiment, an improved process for the cracking of heavy oils have been discovered wherein oil, catalyst and gas are combined and contacted using the preceding apparatus.

DETAILED DESCRIPTION OF THE INVENTION

Figure 1:
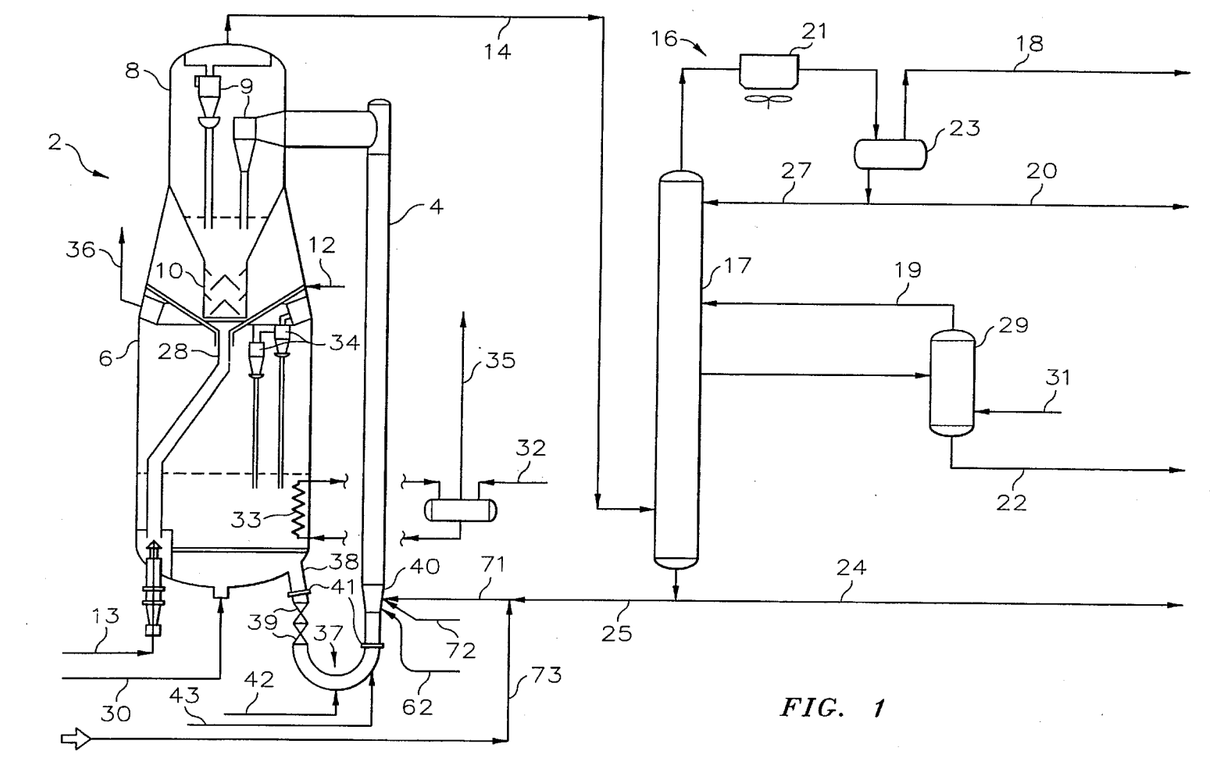
FIG. 1 schematically illustrates certain features of one type of catalytic cracking unit embodying certain features of the present invention.

With reference to FIG. 1, one type of fluid catalytic cracking unit (FCCU) 2 comprises a feed injection zone illustrated by the feed injection cone assembly 40; a reaction zone illustrated by a riser-reactor 4; a catalyst/product separation zone 8 which usually contains several cyclone separators 9; and a stripping section or zone 10 in which gas, preferably steam, is introduced from lines 12 and 13 and strips entrained hydrocarbon from the coked catalyst; a regeneration zone illustrated by a regenerator 6; and a catalyst conveyance zone wherein catalyst is conveyed from the regeneration zone illustrated by 6 to the feed injection zone illustrated by 40.

Overhead product from the separation zone 8 is conveyed via a line 14 to a separation zone 16 including a main fractionator 17. The product can be separated, for example, as follows. Light hydrocarbons which are uncondensed in condenser 21 can be withdrawn from zone 16 by line 18. Gasoline range liquid which has accumulated in the accumulator 23 can be withdrawn by line 20 or refluxed via line 27. Distillates such as light cycle oils can be withdrawn by line 22 from stripper 29 after being stripped with steam introduced via line 31. The overhead of light hydrocarbons 19 from the stripper can be recycled to column 17 and the bottoms can be withdrawn by line 24 or recycled to the riser by line 25, as desired.

After being stripped in the stripping zone 10, the cracking catalyst is conveyed from the stripping zone 10 to regenerator 6 by line or standpipe 28 for coke burnoff. In the regenerator 6, gas containing molecular oxygen is introduced by line 30 which is connected to a source of oxygen-containing gas, usually air. Coke deposits are burned from the catalyst in the regenerator 6 forming an effluent gas which is separated from the catalyst in a plurality of cyclone separators 34. These flue gases are withdrawn from the regenerator 6 by line 36. Coil 33 in the regenerator 6 is used to convert boiler feed water introduced via line 32 to high pressure steam which is withdrawn via line 35. The regenerated catalyst and optionally any make-up catalyst, then flows through the catalyst conveyance zone, the feed injection zone and to the reaction zone.

A key aspect of the current invention is the manner and apparatus associated with the contacting of catalyst, gas and oil in the catalyst conveyance and feed injection zones. Upon leaving the regeneration zone, the hot regenerated catalyst and any make-up catalyst which may have been added at any point in the process, preferably added directly to the regenerator, flows through the catalyst conveyance zone nominally comprised of transfer line 38, which is preferably cylindrical; manipulative valve 39, preferably a slide valve; and the J-bend transfer line 37. Catalyst enters J-bend transfer line 37 flowing in a predominantly downward direction and exits flowing in a predominantly upward direction to the feed injection cone assembly 40. Both transfer line 38 and J-bend transfer line 37 may optionally contain expansion joints 41. In a preferred embodiment illustrated in FIG. 2, the J-bend transfer line is a cylindrical conduit comprised of a straight section 50, a first bend 51, a second straight section 52, a second bend 53 and a third straight section 54. The first and third straight sections are oriented to provide for bulk catalyst flow in principally downward and upward directions. The first bend converts the principle direction of catalyst flow from downward to upward where said upward direction is along a line resulting by rotating the centerline axis 46 for the feed injection assembly clockwise, preferably twenty to seventy degrees, more preferably forty to sixty degrees, and most preferably about fifty degrees. Preferably, centerline axis 46 is vertical. The second bend converts the principle direction of catalyst flow from that exiting the third bend to an upward direction parallel to centerline axis 46 which is preferably vertical. The loci of points for the axis centerline for the first bend are along an arc 55 of designated first radius 56 consistent with the preceding constraints. The loci of points for the axis centerline for the second bend are along an arc 57 of designated second radius 58 consistent with the preceding constraints. As previously noted, the third straight section may contain an expansion joint 41.

Figure 2:
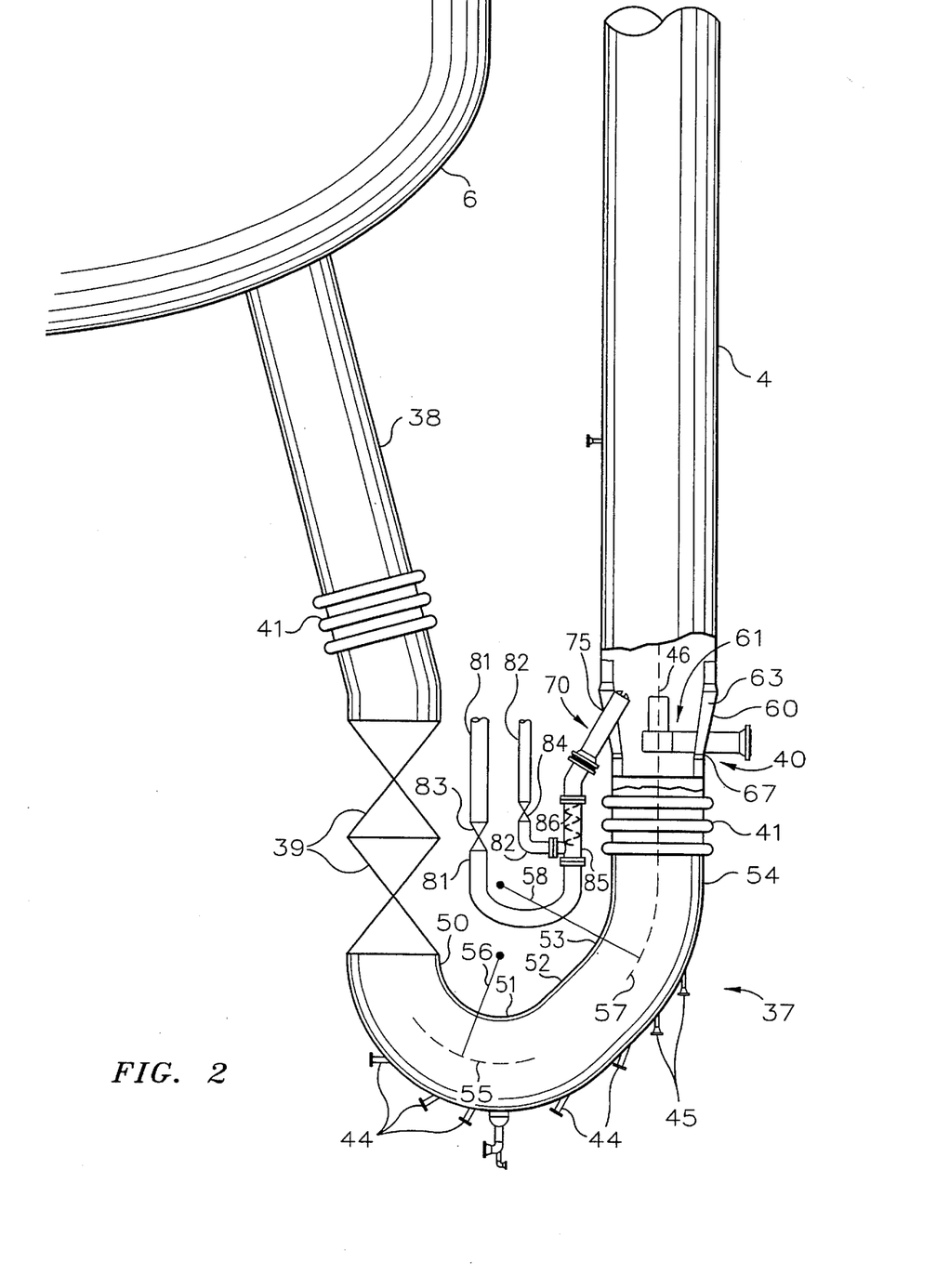
FIG. 2 schematically illustrates in greater detail a portion of the device shown in FIG. 1.

The J-bend transfer line may additionally be comprised of strategically located apertures and ports attached at said apertures. Catalyst movement through J-bend transfer line 37 is facilitated by injecting gas into these ports. This is accomplished by injecting aeration or embulliating gas from line 42 into one or more aeration injection ports 44 and injecting fluidization gas from line 43 into one or more fluidization injection ports 45. As shown in FIG. 2, the gas injection ports 44 and 45 are oriented in a progressive manner with principle directions of injection from nearly perpendicular to centerline axis 46 to nearly parallel to centerline axis 46. In one preferred embodiment as illustrated in FIG. 2, seven gas injection ports are employed with the principal directions of gas injection oriented respectively 90°, 60°, 50°, 30°, 20°, 10° and 0° to the centerline axis 46 passing through the feed injection cone assembly 40. Said centerline axis is preferably vertical.

Figure 3:
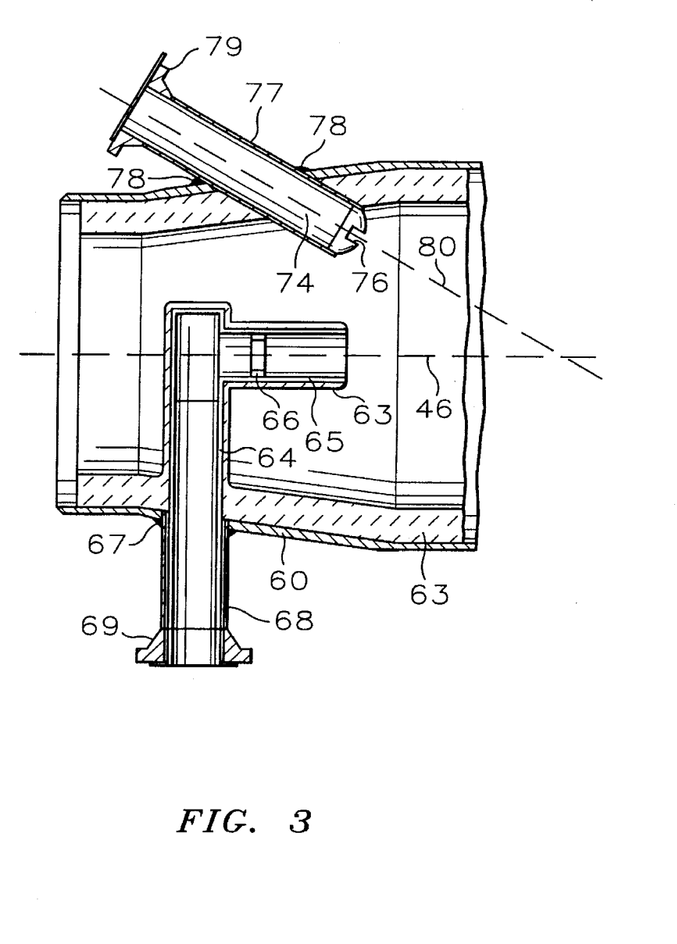
FIG. 3 schematically illustrates in greater detail a portion of the device illustrated in both FIGS. 1 and 2, that being a major portion of the feed injection cone assembly.

As illustrated in FIGS. 2 and 3, the exit end of the J-bend line 37 is connected to the feed injection cone assembly 40 via a leak-tight means for connecting. In one preferred embodiment, the end portion of straight section 54 is welded to the feed injection cone assembly and an expansion joint 41 with flanges inserted into straight section 54.

Figure 4:
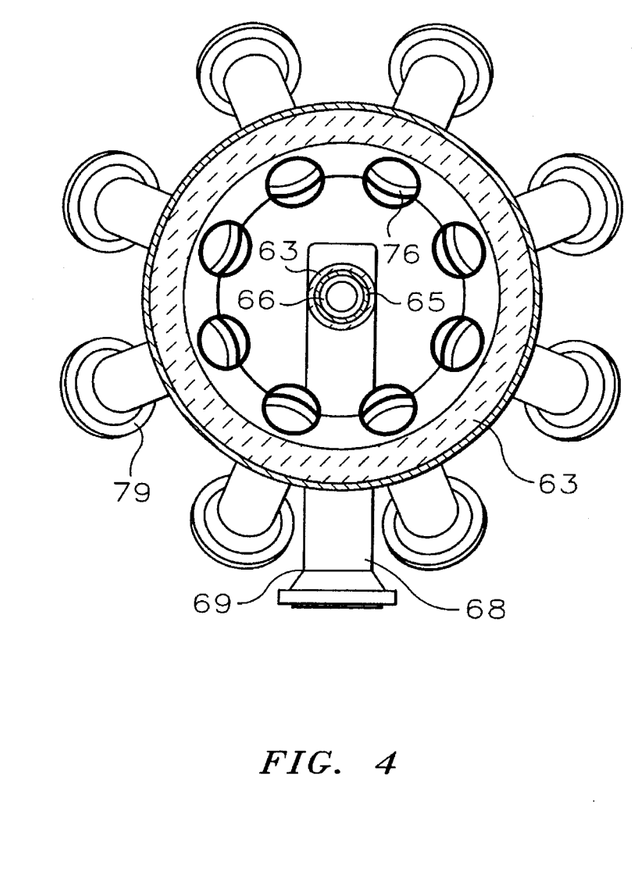
FIG. 4 schematically illustrates a cross-sectional view of a device similar to that illustrated in FIG. 3. The device has been altered such that a cross-sectional view of both a gas nozzle assembly and a major portion of a bifluid nozzle assembly are illustrated.

A key inventive aspect of the current inventions is the apparent efficiency of oil/gas/catalyst contacting which occurs in the inventive feed injection cone assembly 40 when operated at the conditions herein disclosed. A typical feed injection cone assembly 40 is illustrated in FIGS. 3 AND 4 and is nominally comprised of (a) a frustoconically-shaped containing means 60 with centerline axis 46 wherein said containing means is situated in an inverted manner, that being the frustom end is situated below the base end, and the frustom and base ends of said containing means are apertures open to flow, (b) a gas nozzle assembly 61 with at least one inlet aperture and at least one outlet aperture where said outlet aperture is situated inside the frustoconically-shaped containing means 60 and is preferably a single aperture which is centered about centerline axis 46 and oriented for flow in the direction of the base end of said containing means, and (c) at least two bifluid nozzle assemblies 70 arranged radially about the axis centerline wherein each nozzle assembly contains at least one inlet aperture and at least one outlet aperture and said at least one outlet aperture is open to flow toward the centerline axis in a generally upward manner. Effective contacting of oil, gas and catalyst occurs by injecting a catalyst/gas mixture into the frustoconically-shaped containing means 60 through the aperture at the frustom end, injecting an oil/gas mixture through the bifluid nozzle assemblies 70 and injecting only gas through gas nozzle assembly 61. Oil and gas for the bifluid nozzles 70 are provided by oil line 71 and gas line 72 as illustrated in FIG. 1. Oil line 71 is connected to bottoms return line 25 and/or oil feedstock line 73. Gas to the gas nozzle assembly 61 is provided by gas line 62. The cracking reaction is further facilitated by flowing the reaction product/oil/catalyst/gas mixture through the base end aperture on the frustoconically-shaped containing means upward into the reaction zone, preferably a riser-reactor 4.

In another embodiment of this invention, one or both of the apertures for the gas feed nozzle are closed to flow using a blocking means such as a plug, cap or valve thereby preventing gas, oil or catalyst from flowing through the gas nozzle assembly 61. Wishing not to be bound by theory, the presence and relative location of the gas nozzle assembly 61 in the feed injection cone assembly 40 is thought to function in a manner analogous to a check valve thereby significantly reducing catalyst backflow and the mixing of partially reacted catalyst with freshly regenerated catalyst, particularly in the J-bend transfer line 37. Reducing such backmixing is thought to result in improved catalytic cracking performance.

As previously noted, the feed injection cone assembly 40 is affixed at one end to the J-bend transfer line and affixed at the other end to components associated with a reaction zone, preferably a riser-reactor. The exit end of the J-bend transfer line 37 is preferably a generally cylindrical portion of first diameter. Using a suitable means for connecting readily available to those skilled in the art, this end is connected to the frustom end of the frustoconically-shaped containing means 60 on the feed injection cone assembly 40 which is a generally cylindrical portion of second diameter. The base end of the frustoconically-shaped containing means which is a generally cylindrical portion of third diameter is connected using a suitable means for connecting to the entrance section of the riser reactor 4 which is a generally cylindrical portion of fourth diameter. The preferred means for connecting is a weld. Other means include but are not limited to flange assemblies. The first generally cylindrical portion, the frustoconically-shaped containing means, and the fourth generally cylindrical portion preferably are coaxially aligned along centerline axis 46 which is preferably vertical. It is preferred that the first diameter and the second diameter be approximately equivalent and the third diameter and the fourth diameter be approximately equivalent. The second diameter will generally be sized to give a catalyst flux rate on a volummetric basis of 300 to 600 ft/min and more preferably, 400 to 500 ft/min. The third diameter will be generally sized to give an oil mixing zone velocity of 1500 to 2700 ft/min based on an equilibrium heat and mass balance for a given oil in the absence of reaction. More preferably, the oil mixing zone velocity is 1800 to 2400 ft/min. Generally, the third diameter will be about 1.1 to about 2 times the diameter of the second diameter, more preferably about 1.2 to about 1.5, and most preferably about 1.25. The taper or rate of change of diameter with axial length for the frustoconically-shaped containing means 60 is preferably 0.10 to 0.40 in./in., more preferably about 0.20 to about 0.30 in./in. and most preferably about 0.25 in./in.

The gas nozzle assembly 61 which comprises a portion of the feed injection cone assembly 40 is preferably comprised of an entry line 64 which is inserted into an aperture on the frustoconically-shaped containing means 60 thereby providing a conduit for gas flow through the wall of 60 to exit nozzle 65 and exit nozzle 65 which contains the outlet aperture and is oriented toward the base end. This outlet aperture is preferably centered about centerline axis 46. The entry line 64 is affixed to the frustoconically-shaped containing means 60 in a leak tight manner using any suitable means for connecting 67 readily available to one skilled in the art such as a weld or feed through connector.

In a preferred embodiment, the entry line is inserted into a guide or sleeve 68, preferably pipe or tubing of suitable diameter, which has been affixed at an aperture on the frustoconically-shaped containing means 60. A preferred means of affixing is by a weld, a threaded connection or a combination thereof. This arrangement provides increased strength and stability to the gas nozzle assembly 61. A sealing means such as a flange and gasket arrangement 69 is employed to prevent leakage at the connection between the guide 68, entry line 64 and gas line 62. The entry line 64 preferably intersects the centerline axis 46 at right angles. The gas conduits are preferably cylindrical thereby resulting in less friction (i.e., lower pressure drop) as the catalyst-bearing gas phase flows around the gas nozzle assembly 61 in the feed injection cone assembly. When there is gas flow through the gas nozzle assembly, it is preferred that the exit nozzle contain an orifice or other flow restriction device 66 to insure sufficient pressure drop across the nozzle and therefore sufficient gas flow velocity to prevent catalyst from settling and possibly plugging the gas nozzle.

In another embodiment which is not illustrated, the gas nozzle 61 assembly is partially comprised of a first pipe which passes through the wall of the conically-shaped containing means 60 at an aperture on said means, a pipe elbow or pipe tee with a plug, and a second pipe. The first pipe is screwed into the aperture of the pipe elbow or preferably one of the opposing apertures in a pipe tee, the other opposing aperture having been plugged, and the second pipe is screwed into the remaining aperture which is situated in a vertical upward position, preferably centered on the centerline axis 46. Optionally, screwed or inserted into said second pipe is an orifice of sufficient size to insure a pressure drop across the orifice of at least 0.5 psi. Said first pipe may be affixed to the conically-shaped containing means or situated inside a guide which is affixed to said containing means as previously discussed.

In the preceding embodiments, the entry line 64 and gas nozzle 65 are preferably cyclindrical conduits. The ratio of the outside diameter of these components including any protective coating to the inside diameter of the frustoconically-shaped containing means at the frustom end is generally 0.10 to 0.50, preferably about 0.15 to about 0.40, still more preferably about 0.20 to about 0.35 and most preferably about 0.28. Preferably, the longitudinal axis of the entry line 64 will intersect the centerline axis 46 of the containing means 60 at right angles. The location of this point of intersection relative to the frustom end is 0.10 to 0.50 h, more preferably about 0.12 to about 0.32 h, and most preferably about 0.22 h where h is the length of the containing means and is the distance measured along the centerline axis 46 between the frustom end and the base end.

The bifluid nozzle assembly 70 in one embodiment is nominally comprised of a bifluid nozzle 74 containing at least one inlet aperture and at least one outlet aperture which is inserted into an aperture on the frustoconically-shaped containing means 60 and a means for connecting 75 said nozzle in a leaktight manner to the frustoconically-shaped containing means 60. The apertures for the bifluid nozzles are arranged about the frustoconically-shaped containing means 60. Preferably, the angular relationship of neighboring apertures for the bifluid nozzles relative to the centerline axis is about 360 degrees divided by the number of bifluid nozzles. It is also preferred that said apertures be located at a fixed distance frown the centerline axis 46. The latter two preferences are illustrated in FIGS. 3 and 4. Additionally, it is preferred that the angular relationship relative to the centerline axis between neighboring bifluid nozzle aperatures and the gas nozzle aperture be about the angular relationship for the neighboring bifluid nozzles divided by two.

In another embodiment, the bifluid nozzle assembly 70 is designed such that the nozzles may be removed as illustrated in FIGS. 3 and 4. In this embodiment, this is accomplished by providing a nozzle guide or sleeve 77, a generally cylindrical means for supporting the bifluid nozzle 74 such as pipe or tubing of slightly larger diameter and a means for fastening 78 the nozzle guide 77 to the frustoconically-shaped containing means upon insertion into the appropriate aperture. The preferred means is a weld. The nozzle guide assembly is also comprised of a means for connecting and sealing 79 nozzle guide 77 to the bifluid nozzle 74 such as a flange and gasket assembly to prevent catalyst, oil and/or gas leakage. FIGS. 3 and 4 are schematics of the feed injection cone assembly but are not internally consistent in all respects. FIG. 4 has been modified so as to provide a cross-sectional view which illustrates both the gas nozzle assembly 61 and portions of the bifluid nozzle assembly 70.

The bifluid nozzles 74 can be of any commercially available design which provides for intimate gas/liquid contacting and liquid atomization. As shown in FIGS. 3 and 4, the body of the nozzle is preferably cylindrical and each nozzle contains at least one outlet aperture. Suitable nozzles include but are not limited to Kellogg ATOMAX nozzles, Kellogg slotted-type nozzles, impact-type high pressure drop slotted-type nozzles and open pipe "Showerhead" type nozzles. Slotted-type nozzles are preferred. The tip of each slotted-type nozzle contains an outlet aperture or slot 76 which provides a flat, fan-shaped spray. Preferably, the slots 76 are oriented as depicted in FIGS. 3 and 4 wherein the slot is aligned along the 90 to 270 degree line if the top of the nozzle is defined to be 0 degrees and the bottom 180 degrees. As previously noted, the nozzles may be affixed directly 75 to the frustoconically-shaped containing means 60 or may be inserted into a guide 77 which is attached 78 to said containing means 60.

The bifluid nozzle assemblies 70 and the gas nozzle assembly 61 preferably have outlets in the upper half of the feed injection cone assembly 40. Defining the length of the frustoconically-shaped containing means 60 of the feed injection cone assembly 40 to be h where h is the distance between the frustom end and the base end measured along the centerline axis 46, the outlets measured relative to the frustom are preferably located between about 0.50 and about 1.0 h, more preferably between about 0.70 and about 0.90 h, and most preferably at about 0.80 h. The bifluid nozzle assemblies 70 and the gas nozzle assembly 61 are preferably arranged such that the aperture for each bifluid nozzle 74 and the aperture for the gas exit nozzle 65 correspond to similar positions relative to the centerline axis 46. When the axis is in the preferred vertical position, the apertures for the bifluid nozzles and the gas exit nozzle are at similar heights. For a given bifluid nozzle with outlet aperture at a given location relative to the frustom end, the point at which the longitudinal axis 80 for said nozzle and the aperture center for said nozzle intersect will also preferably intersect the loci of points for a circle of diameter 0.75 to 0.95 d, more preferably about 0.80 to about 0.90 d, and most preferably about 0.86 d where d is the diameter of the frustoconically-shaped containing means at the same location relative to the frustom end as the nozzle aperture.

The longitudinal axis of each bifluid nozzle 80 when extended to pass through the centerline axis 46 of the feed injection cone assembly preferably intersects centerline axis 46 at an angle of ten to seventy-five degrees, more preferably twenty to fifty degrees and most preferably about thirty degrees. The nozzles are preferably arranged relative to one another at angles such that the flow or spray pattern from each nozzle will impinge in major portion on the flow or spray pattern from the other nozzles and thereby avoid significant impingement on the opposing wall of the feed injection cone assembly and/or riser. The nominal number of nozzles to insure radial injection is 2. Generally, three to ten bifluid nozzles are preferred. It is preferred that the angle of each bifluid nozzle in a multiple nozzle systeam be about the same angle, most preferably about thirty degrees. The total number of nozzles for a given feed injection cone is dependant on the desired capacity of the fluidized catalytic cracking unit and operating characteristics of the selected nozzles. These nozzles are generally selected using the knowledge and expertise of one skilled in the art. Example 1 presented herein discloses a preferred inventive design for a feed injection cone assembly 40 comprised of a gas nozzle assembly 61 and seven bifluid nozzles 70 arranged radially about a frustoconically-shaped containing means 60 of increasing diameter.

Oil and gas is collectively supplied to the bifluid nozzle assemblies via lines 71 and 72 as illustrated in FIG. 1, respectively. Each bifluid nozzle assembly 70 as illustrated in FIG. 2 may be further comprised of separate oil and gas supply lines, 81 and 82 and other associated downstream components. Preferably, each bi-fluid nozzle assembly 70 will process a portion of oil generally corresponding to the total oil flow into the feed injection cone assembly 40 divided by the number of operational bi-fluid assemblies. Oil and gas supply lines 81 and 82 are respectively connected to lines 71 and 72 and contain control valves, 83 and 84, which regulate the flow of oil and gas to combination chamber 85 where the oil and gas are first combined. The combined fluids then flow through a mixing chamber 86, preferably a static mixer, to the remainder of the bifluid nozzle assembly for injection into the frustoconically-shaped containing means 60 on the feed injection cone assembly 40. In a preferred embodiment, the oil and gas to lines 81 and 82 supplied via lines 71 and 72 respectively are supplied via separate oil and gas ring headers which encircle the riser 4 or feed injection cone assembly 40.

As noted in part in FIG. 3 and in EXAMPLE 1, the internal surfaces of key components which are exposed to catalyst flow and elevated temperatures, including but not limited to the transfer line 38, J-bend transfer line 37, frustoconically-shaped containing means 61 on the feed injection cone assembly 40, riser 4, entry line 64, gas nozzle 65, the bifluid nozzle tips and guide assemblies 77 are coated with a refractory material or a special erosion resistant metal 56. A preferred refractory material is a castable, heat set type such as Resco AA22.

As previously noted, the catalyst/oil/gas mixture which is generated within the feed injection cone assembly exits the feed injection zone and flows upward through the riser where additional hydrocarbon cracking occurs. The operating conditions for the riser-reactor 4 and regenerator 6 can be conventional. Usually, the temperature in the riser-reactor 4 will be in the range of from about 850° to about 1050° F., preferably in the range of 925° to 1025° F. for heavy oils.

The oil is usually admixed with gas at a weight ratio of oil to gas in the range of from about 6:1 to about 25:1 more preferably about 15:1 to 20:1 and most preferably about 17.5:1. Because the majority of the gas is injected with the oil at the bifluid nozzle, the preceding weight ratios are also representative of the weight ratios of oil to steam injected through the bifluid nozzles. Gas is injected into the J-bend transfer line via aeration ports at a net flowrate effective to maintain catalyst movement along the J-bend transfer line, into the fluidization ports at a flowrate effective to fluidize the catalyst as it enters the feed injection cone assembly and into the gas nozzle assembly at a flowrate effective to facilitate oil/gas/catalyst mixing. These flowrates are generally about 0.5 to about 6 wt %, about 0.5 to about 6 wt % and greater than 0 to 6 wt % of the total gas injected into the bifluid nozzle assemblies. More preferably the flowrates are respectively about 1.5 to about 4 wt %, about 1 to 4 wt %, and about 0.5 to about 4 wt %. A still more preferred gas flowrate for gas injection into the gas nozzle assembly is about 2 to about 4 wt % of the total gas injected into the bifluid nozzles. The most preferred flowrates are respectively about 3 wt %, about 2 wt % and about 2 wt % of the total gas injected into the bifluid nozzle assemblies. The gas is selected from the group consisting of hydrogen, carbon monoxide, light hydrocarbons possessing a carbon number of less than 6, inert gases, and steam. Preferred gases are steam and the reducing gases consisting of hydrogen, carbon monoxide and saturated hydrocarbons containing less than 6 carbon atoms. The most preferred gas for injection, regardless of location, is steam.

In another process embodiment, inventive conditions are as previously described with the exception that the gas flowrate from the center nozzle 65 is zero. As previously noted and wishing not to be bound by theory, it is believed that the internal design of the feed injection cone and the manner of process operation reduces the degree of catalyst backmixing and thereby reduces the relative differences in the ages or time the oil and catalyst particles have spent in the feed injection zone and the reaction zone prior to contact with one another in said zones. It appears highly desirable that the contacting of once oil-contacted catalyst with fresh oil be minimized. The presence of the gas nozzle assembly 61 in the absence of gas flow apparently functions in a manner analogous to a check valve thereby reducing the degree of catalyst backmixing and thereby facilitating a more plug-like flow of catalyst and oil.

A catalyst:oil weight ratio employed in the riser-reactor 4 is generally in the range of from about 2:1 to about 20:1, usually between about 2:1 and about 15:1, preferably between about 3:1 to about 10:1. Pressure in the riser-reactor 4 is usually between about 15 and about 60 psia (pounds per square inch absolute), preferably less than about 25 psia for heavy oils. The cracking catalyst particles generally have a size of the range of from about 20 to about 200 microns, usually between about 40 and 80 microns, preferably principally about 60 microns. Flow velocity upward in the vertical section of the riser-reactor is generally from about 10 to 30 feet per second in the lower portion up to between about 40 and about 120 feet per second in the upper portions. The contact time between the catalyst and oil in the riser-reactor is generally in the range of from about 0.25 to about 4 seconds, usually from 1 to about 3 seconds when the oil is injected into the bottom of the riser. Preferably, contact times for heavy oils are less than 2.5 seconds. The regenerator is operated at a temperature typically in the range of from about 1100° to about 1500° F., usually from about 1150° to 1450° F., and is ordinarily provided with sufficient oxygen containing gas to reduce the coke on the catalyst to a level of about 0.5 weight percent or less, preferably less than 0.1 weight percent.

Catalysts suitable for catalytic cracking includes silica-alumina or silica-magnesia synthetic microspheres or ground gels and various natural clay-type or synthetic gel-type catalysts. Most preferably, fluidizable zeolite-containing cracking catalysts are employed. Preferred catalysts can contain from about 2 to about 20 percent based on total weight of zeolitic material dispersed in a silica-alumina matrix and have a B.E.T. surface area in the range of 50–500 $m^2/g$ and a particle size chiefly in the range of 40–80 microns.

As previously noted and in accordance with certain other aspects of the invention, the process of catalytically cracking oil feedstock comprises introducing oil and gas via two or more bifluid (oil/gas) nozzles into a stream of hot cracking catalyst particles. The feedstock is introduced as the hot cracking catalyst particles move around a flow restriction in the feed injection cone assembly 40 resulting from the gas nozzle assembly 61. The gas nozzle 65 associated with the gas nozzle assembly 61 in one embodiment introduces into this mixing zone a slow flow rate of gas, preferably steam, which apparently effects in a favorable the mariner in which gas, oil and catalyst is contacted. At this point, the oil feedstock is heated by the hot catalyst, a significant portion of the oil is vaporized and the cracking reaction is initiated. The unique flow dynamics which result from this unique arrangement of hardware, the optional flow of gas through the gas nozzle assembly, and the overall flow of oil, gas and catalyst components apparently facilitates the manner and efficiency of component contacting thereby unexpectedly resulting in increased oil throughput and yields of higher valued components over other comparative configurations.

Upon leaving the feed injection cone assembly, the reaction mixture flows into a reaction zone, preferably a riser-reactor, wherein additional cracking occurs. The product from the reaction zone then flows into a catalyst/product separation zone, preferably a disengagement chamber, wherein the cracked oil product is separated from the catalyst, and sent to a fractionation zone. The cracking catalyst, which contains coke deposits is passed to a stripping zone, stripped, and then passed by gravity to a regeneration zone for contact with an oxygen-containing gas to form the hot cracking catalyst particles. Generally speaking, the hot cracking catalyst particles are withdrawn from the regeneration zone through a generally vertically oriented standpipe and the flow rate is controlled as desired by one or more slide valves positioned in the standpipe. The catalyst then flows through a J-bend transfer line wherein catalyst flow is converted from a principally downward to principally upward direction. The catalyst then enters the feed injection cone and associated mixing zone. Catalyst transfer through the standpipe or the transfer line and the J-bend transfer line can be facilitated by injecting gas, preferably steam, into the catalyst bed. The catalyst bed is transported by gas flow, preferably steam, to the feed injection cone assembly whereupon the catalyst is contacted with oil and a gas, preferably steam, in the manner previously set forth.

The following examples are intended to illustrate the advantages of this invention, but are not intended to unduly limit this invention.

EXAMPLE 1

The following table illustrates how the invention has been applied to a commercial fluid catalytic cracker unit (i.e., a cat cracker).

TABLE 1

Representative Values for the Fluidized Bed Catalytic Cracking Unit Illustrated in FIGS. 1–4 Charge Oil at 300° F.

| Item[1] | Design |
|---|---|
| Recycle bottoms (25) | 2966 BPD |
| Density | 5 API |
| Oil Feedstock (45) | 55742 BPD |
| | 19.6 API |
| Riser Steam Added | |
| Stream (42) - Aeration Steam | 1,000 lb/hr |
| Stream (43) - Fluidization Steam | 1,500 lb/hr |
| Stream (45) - Gas Feed Nozzle Steam | 1,000 lb/hr |
| Stream (71) - Total Steam to Bifluid Nozzles | 40,000 lb/hr |
| Stripping Steam at 470° F. (13) | 65 psig |
| | 15,000 lb/hr |
| Regenerated Catalyst at 1280° F. (38) | 49.1 ton/min |
| Air for Regeneration (30) | |
| Rate | 1.23 MM lb/hr |
| Temperature | 440° F. |
| Pressure | 54 psia |
| Regenerator (6) | |
| Pressure | 47 psia |
| Temperature | 1300° F. |
| Diameter | 49 ft |
| Length | 57 ft |
| Riser-Reactor (in sections from feed injection cone (4) | |
| (1) Cylinder Length | 131 ft. |
| Diameter | 50 in. I.D. |
| (2) Cone Length | 3 ft. |
| Diameter | 50 in. diverging to 54 in. I.D. |
| (3) Cylinder length | 20 ft. 3 in. |
| Diameter | 54 in. I.D. |
| Refractory Thickness for (1), (2) and (3) | 5 in. |
| Regenerated catalyst standpipe (38) | 40 in. I.D. |
| Feed Injection Cone Assembly (40) | |
| Change in Diameter over Taper | 38 in. ID to 48 in ID |
| Cone Length | 3 ft. 4 in. |
| Refractory thickness | 5 in. |
| Bifluid nozzles: | 7 Kellogg 6 in. dia. slotted type nozzles. Oriented 30° to vertical. Slots oriented as in FIGS. 3 and 4 |
| Gas Injection Nozzle (44) | 8 in. scheduled 160 pipe; 4¾ in. O.D. orifice; 1 in. refractory coating thickness on pipe O.D. Axis of entry located at 0.22 h. Located on cone centerline axis. |
| Refractory Thickness Around Gas Nozzle Assembly | 0.75 in. |
| Nozzle Opening Location | 21⅞ in. above cone base for all nozzles |
| Bifluid Nozzle Injection Rate | |
| Oil | 60,000 bbl/d |
| Steam | 40,000 lb/h |
| Gas Nozzle Injection Rate | 1,000 lb/h |
| Steam | |
| J-Bend Line (37) | |
| First cylindrical bend radius | 48 in. |
| Second cylindrical bend radius | 72 in. |
| Line Inside Diameter | 38 in. |
| Refractory Tickness | 5 in. |

TABLE 1-continued

Representative Values for the Fluidized Bed Catalytic Cracking Unit Illustrated in FIGS. 1–4 Charge Oil at 300° F.

| Item[1] | Design |
|---|---|

[1]Numbers in parenthesis indicate identification number on Figures.

EXAMPLE 2

This Example provides comparative data for the operation of a commercial heavy oil fluid catalytic cracking unit (FCC unit). This data shows that when operated at the inventive conditions, the FCC unit can process greater amounts of fresh feed, produce greater amounts of desired hydrocarbon fractions and produce said fractions at a greater yield than observed in prior studies at base case conditions.

Presented in Tables 2, 3A and 3B are comparative data obtained at Inventive Conditions and Base Cases A and B. In all cases, the data was averaged over the two month interim period immediately following a turnaround. Historically, process performance during this time period has been quite good thereby providing a basis for comparing process performance. With regard to Base Cases A and B, all slurry recycle and approximately 15 to 30% of the fresh feed was introduced into the feed cone assembly through the gas nozzle assembly.

The FCC unit employed in these studies has physical characteristics analogous to those disclosed in Table 1. Engineers familiar with the operation of this unit attributed at least 40 to 50% of the improvement in unit performance between the Inventive Conditions and the Base Case conditions to result from operational changes associated with the Feed Injection Cone Assembly.

Reviewing Table 3, the Fresh Feed rate at the Inventive Conditions are respectively 9.2 and 5.3% greater than Base Cases A and B. However this increase in feed rate is accompanied by yields and conversions which are comparable with the base case thereby resulting in significant increases in the production of higher value components over that possible at the base case conditions. As an example, gasoline production increased by 14.3 and 9.4% over Base Cases A and B, respectively.

TABLE 2

FCCU Operating Parameters/Conditions for Three Two Month Operating Periods Immediately Following a Turnaround

| Fresh Feed Properties | Inventive Conditions | Base Case A | Base Case B |
|---|---|---|---|
| API Gravity | 19.6 | 19.0 | 19.4 |
| Sulfur, wt. % | 0.38 | 0.44 | 0.51 |
| Nickel, ppm$_w$ | 7.8 | 10.4 | 5.8 |
| Vanadium, ppm$_w$ | 9.1 | 10.7 | 8.8 |
| Viscosity at 210° F., Saybold Universal | 117 | 135 | — |
| Basic Nitrogen, ppm$_w$ | 731 | 959 | 720 |
| Conradson Carbon, wt. % | 6.2 | 6.7 | 6.7 |
| Nickel to HOC, lb/day | 150.5 | 180.3 | 103 |
| Vanadium to HOC, lb/day | 153.2 | 179.4 | 146.5 |
| Avg. Catalyst Addition Rate, tpd | 24 | 31 | 24 |
| Equilibrium Catalyst Properties | | | |
| Davidson Catalyst Type | GXP-8S | GXP-8S | GXP-5 |
| MAT Activity | 69.1 | 69.1 | 69.4 |
| Surface Area m$^2$/g | 152 | 153 | 125 |

TABLE 2-continued

FCCU Operating Parameters/Conditions for Three Two Month Operating Periods Immediately Following a Turnaround

| Fresh Feed Properties | Inventive Conditions | Base Case A | Base Case B |
|---|---|---|---|
| Pore Volume, cc/g | 0.32 | 0.32 | 0.30 |
| $Al_2O_3$ wt. % | 33.2 | 30.7 | 31.8 |
| Sodium, wt. % | 0.42 | 0.41 | 0.34 |
| Iron, wt. % | 0.61 | 0.48 | 0.52 |
| Vanadium, $ppm_w$ | 2969 | 2997 | 2242 |
| Nickel, $ppm_w$ | 2785 | 2355 | 1352 |
| $Re_2O_3$, wt. % | 1.61 | 2.13 | 1.46 |
| Unit Cell Size | 24.28 | 24.29 | 24.28 |

EXAMPLE 3

This Example provides comparative data showing the versatility and increased capacity of the inventive systeam over an extended time period of operation. Presented in Tables 4A, 4B, 5A, 5B and 5C are results for 9 consecutive months of process operation. The performance characteristics for the first month were previously included in their entirety in the Inventive Conditions previously reported in Example 2 for the 2 month period immediately following a turnaround. The results presented herein demonstrate the ability of the modified FCC trait to process differing feeds, to tolerate upturns and downturns in feed rate, and further demonstrate the ability of the unit to consistently process fresh feed at rates significantly greater than those reported for Base Cases A and B in Example 2.

TABLE 3A

Performance Characteristics of Heavy Oil Cracker During Two Month Interim Period Following Turnaround

| | Inventive Conditions | | Base Case A | | Base Case B | |
|---|---|---|---|---|---|---|
| | BBL/D | Liquid Vol %[1] | BBL/D | Liquid Vol %[1] | BBL/D | Liquid Vol %[1] |
| Feed Rates | | | | | | |
| Fresh Feed | 55742 | 100 | 51059 | 100 | 52919 | 10.0 |
| Slurry Recycle | 2966 | 5.3 | 5247 | 10.3 | 3496 | 6.6 |
| Steam Rate (lb/hr) | | | | | | |
| Bifluid Nozzles | 45000–55000 | | 45000–55000 | | 45000–55000 | |
| Gas Nozzle | 500–1500 | | 500–1500 | | 500–1500 | |
| Aeration Nozzles | 1000–2000 | | 1000–2000 | | 1000–2000 | |
| Fluidization Nozzles | 500–1500 | | 500–1500 | | 500–1500 | |
| Product Yields | | | | | | |
| Conversion[2] | 45124 | 77.3 | 4212 | 78.9 | 40317 | 77.2 |
| Gasoline | 32805 | 55.9 | 28684 | 53.6 | 29985 | 57.4 |
| Light Cycle Oil | 7930 | 13.5 | 6148 | 11.4 | 7675 | 14.7 |
| $C_3$ Olefins | 4349 | 7.4 | 4726 | 8.9 | 4117 | 7.8 |
| $C_3$-Other | 1803 | 3.1 | 1866 | 3.5 | 1822 | 3.5 |
| $C_4$ Olefins | 5391 | 9.2 | 4667 | 8.7 | 3950 | 7.6 |
| $iC_4$ | 3442 | 5.8 | 3211 | 6.0 | 3095 | 5.9 |
| $NC_4$ | 1356 | 2.3 | 1228 | 2.3 | 939 | 1.8 |

TABLE 3B

Performance Characteristics of Heavy Oil Cracker During Two Month Interium Period Following Turnaround

| | Inventive Conditions | | Base Case A | | Base Case B | |
|---|---|---|---|---|---|---|
| | BBL/D | Liquid Vol %[1] | BBL/D | Liquid Vol %[1] | BBL/D | Liquid Vol %[1] |
| Total $C_3/C_4$ | 16340 | 27.8 | 15698 | 29.5 | 13924 | 26.6 |
| Heavy Cycle Oil | 2788 | 4.7 | 2327 | 4.2 | 1536 | 2.9 |
| Decant Oil | 2705 | 4.6 | 3047 | 5.6 | 2702 | 5.2 |
| $C_2$ and Lighter, | | | | | | |
| kscfd | | 17881 | | 21418 | | 12284 |
| wt. % | | 3.6 | | 5.0 | | 3.1 |
| scf/bbl | | 321 | | 422 | | 231 |
| Coke, lb/hr | | 86407 | | 90737 | | 81278 |
| Coke Yield, lb/bbl conversion | | 47.2 | | 50.8 | | 47.2 |

[1]Liquid Volume % defined to be bbl/day of designated component divided by bbl/day Fresh Feed

[2]Conversion defined to be $\dfrac{\text{Fresh Feed} - [\text{Heavy Cycle Oil} + \text{Decant Oil}]}{\text{Fresh Feed}}$ where respective units are bbl/d.

Scientists and engineers skilled in the art and familiar with the operation of this FCC unit attribute at least 40 to 50% of the improvement in performance between the results presented herein and those reported in the Base Cases to result from changes in the operation of the Feed Injection Cone Assembly.

Month 1

As previously noted, the performance results for Month 1 were included in the results reported under inventive conditions in Table 2. These results are consistent with the results in this table.

Month 2

The feed properties to the FCC unit improved slightly for Month 2 as the API gravity increased from 19.6 to 20 and the sulfur, metals and basic nitrogen were somewhat lower. Conversion during this time period increased significantly over the previous month and averaged 78.7% versus 76.2%. Converted barrels averaged 48,771 bbl/d compared to 44,709 bbl/d in the previous month. Gasoline production increased to 34,964 bbl/d (56.5% yield) from 32,239 bbl/d (54.9% yield). The production and yield of light cycle oil were slightly reduced. Light cycle oil was reduced from 8,059 bbl/d and 13.7% yield to 7,219 bbl/d and 11.6% yield. Fuel oil was reduced from 5,935 bbl/d and 10.1% yield to 5,982 bbl/d and 9.6% yield.

Compared to respective Base Cases A and B, the production rate for gasoline in Month 2 was 21.8 and 16.6% greater than that observed for the respective Base Cases.

Month 3

The feed properties to the FCC unit improved over those of the previous month due mainly to a reduction in Conradson carbon and basic nitrogen. The feed rate to the FCC unit was also lower than in the previous month.

Conversion increased over the previous month from 78.7 to 79.6%. Gasoline yield increased from 56.4 to 57.7%, the yield of light cycle oil increased slightly form 11.6 to 11.9% and the yield of fuel oil decreased slightly from 9.6 to 8.4%. Because of the lower charge rate, the conversion decreased from 48,771 to 45,965 bbl/d, gasoline production decreased less dramatically from 34,964 to 33,294 bbl/d, light cycle oil decreased from 7,219 to 6,884 bbl/d and fuel oil decreased from 7,219 to 5,982 bbl/d.

The preceding demonstrates the flexibility of the FCC unit in that the feed rate was reduced or turn downed by 5.8 vol %, process operability remained quite good and for the feed oil employed, the yields of gasoline and light cycle oil improved.

Additionally a stack test was conducted to demonstrate environmental compliance at a charge rate of 68,400 bbl/d. This rate is 34% and 29% greater than Fresh Feed rates in Base Cases A and B. With the exception of unexpectedly high numbers for NOx, stack compliance targets were met.

Month 4

Feed properties to the FCC unit were much poorer during this month due to lower API gravity, greater viscosity, much higher vanadium and much higher Conradson carbon. Additionally, the fresh feed charge rate to the unit was lowered further from 45,985 bbl/d in the previous month to 43,574 bbl/d. Testing and evaluation was initiated on a bottoms cracking additive designed to enhance bottoms cracking and reduce fuel oil production.

Conversion was observed to increase from 76.2% in the previous month to 77.0%. Converted barrels dropped only slightly from 44,709 bbl/d to 43,574 bbl/d. Similarly, gasoline production decreased only slightly and averaged 31,816 bbl/d versus 32,239 bbl/d for the previous month. Gasoline yield improved from 54.9% to 56.2%. Light cycle oil and fuel oil averaged 6,468 and 6,535 bbl/d and respective yields of 11.4% and 11.6%. This compares to light cycle oil and fuel oil production rates in the previous month of 8,059 and 5,935 bbl/d and respective yields of 13.7 and 10.1%.

Despite the turndown in fresh feed rate and the more difficult feed composition, the rate of gasoline production for this month when compared to Base Cases A and B was 10.9 and 7.5% greater. The corresponding fresh feed charge rates for the current month when compared to the Base Cases were respectively, 10.7% and 6.9% greater. These results demonstrate that the inventive FCC unit provides a significant increase in gasoline production rate over the base cases while maintaining similar or improved gasoline yields.

Month 5

Feed properties improved over the previous month as the API gravity increased and the viscosity and Conradson carbon decreased. The Fresh Feed charge rate was increased from 56,578 bbl/d to 60,655 bbl/d or by 7.2%. Addition of the bottoms cracking additive was continued.

Despite the much higher charge rates, conversion increased significantly over the previous month from 78.7% to 79.3%. Converted barrels rose by 10.3% from 43,574 to 48,074 bbl/d. Gasoline yield improved from 56.2% to 59.0% and production increased by 12.5% from 31,816 bbl/d to 35,801 bbl/d. Light cycle oil and fuel oil averaged 8,480 bbl/d (14.0% yield) and 4,101 bbl/d (6.8% yield) compared to 6,468 bbl/d (11.4% yield) and 6,535 bbl/d (11.6% yield) in the previous month.

Compared to Base Cases A and B, the gasoline production rate has been increased by 24.8 and 19.4% while the respective increase in fresh feed charge rates has been increased by only 18.8 and 14.6%, respectively.

Month 6

Feed properties from the previous month changed little; nickel increased and vanadium, Conradson carbon and basic nitrogen decreased.

FCC performance generally parallel the performance of the preceding month. Conversion remained high at 78.0% versus 79.3% in the previous month. Converted barrels were 48,891 versus 48,074 in the previous month. Gasoline production remained steady at 35,676 bbl/d (58.0% yield) versus 35,801 bbl/d (59.0% yield). Light cycle oil and fuel oil averaged 8,691 bbl/d (14.1% yield) and 4,830 bbl/d (7.8% yield) compared to 8,480 bbl/d (14.0% yield) and 4,101 bbl/d (6.8% yield) in the previous month.

Month 7

The fresh feed rate for this month of 60,531 bbl/d was slightly less than the 61,562 bbl/d in the preceding month. Vanadium in the feed was almost 40% greater than during the previous month and the oil viscosity decreased from 98.3 to 65 Saybold Universal Units when measured at 210° F. Other properties remained little changed.

Conversion during this month increased from 78.0% to 78.6%. Gasoline production rose slightly to 35,837 bbl/d from 35,676 bbl/d in the previous month and yield increased by 1.2% from 58.0 to 59.2%. Gasoline production in this month was 24.9 and 19.5% greater than that observed for Base Cases A and B respectively.

Addition of a bottoms cracking additive was discontinued early in this month. A preliminary evaluation concluded good production of C3's, C4's and gasoline production but poor bottoms cracking and an insignificant effect on fuel oil reduction.

Month 8

The fresh feed rate was increased by 3.7% from that of the previous month while the vanadium content of the fresh feed increased another 8% to 17.6 ppm. Viscosity increased from 65.0 to 84.2 Saybold Universal Units when measured at 210° F.

Conversion decreased during this month from 78.6% to 76.7%. While the gasoline yield decreased, the gasoline production remained essentially constant. The yield and rate of production of both light cycle oil and fuel increased over that of the preceding month.

Preliminary flue gas stack analysis indicated environmental compliance to be possible at flow rates greater than 66,000 bbl/d for the tested fresh feed composition. Injection of a bottoms cracking catalyst was initiated this month. At the end of the month, bottoms cracking catalyst comprised approximately 5% of the circulating catalyst inventory.

Month 9

The fresh feed rate decreased by approximately 1,000 bbl/day and the vanadium in the fresh feed decreased from 17.6 to 11.0 ppm. Other fresh feed properties changed very little from those of the preceding month. The addition of bottoms cracking catalyst continued aiming toward a final circulating catalyst inventory of 20–30%. Catalyst inventory at the end of the month was approximately 15%.

Conversion increased from 76.7 to 78.9%, the number of converted barrels increased by almost 500 bbl/d and gasoline production increased by approximately 600 bbl/d. The production of light cycle oil increased from 5,998 bbl/d to 9,165 bbl/d but the production of fuel oil dramatically decreased from 5,998 bbl/d to only 3,792 bbl/d.

The gasoline production rate of 36,819 bbl/d is the highest observed to date and is respectively 28.3 and 22.8% greater than Base Cases A and B in Example 2 whereas the fresh feed rates are respectively 20.3 and 16.1% greater.

TABLE 4A

Operating Parameters/Conditions for an FCCU Operated at the Inventive Conditions

|  | Month 1 | Month 2 | Month 3 | Month 4 | Month 5 | Month 6 | Month 7 | Month 8 | Month 9 |
|---|---|---|---|---|---|---|---|---|---|
| Fresh Feed | | | | | | | | | |
| API Gravity | 19.6 | 20.0 | 20.2 | 19.6 | 20.0 | 20.2 | 20.3 | 20.0 | 20.8 |
| Sulfur, wt. % | 0.4 | 0.3 | 0.3 | 0.31 | 0.35 | 0.32 | 0.37 | 0.41 | 0.39 |
| Nickel, $ppm_w$ | 7.5 | 7.1 | 10.7 | 10.7 | 10.4 | 11.1 | 10.4 | 10.0 | 8.2 |
| Vanadium, $ppm_w$ | 9.8 | 10.2 | 8.6 | 12.7 | 12.8 | 11.7 | 16.3 | 17.6 | 11.0 |
| Basic Nitrogen, $ppm_w$ | 916.0 | 761.0 | 644.0 | 568.0 | 670.0 | 565.0 | 455.0 | 569.7 | 555.0 |
| Conradson Carbon, wt. % | 6.2 | 6.3 | 5.5 | 7.0 | 5.6 | 4.8 | 4.6 | 4.8 | 4.4 |
| Viscosity at 210° F., Saybold Universal | 116.0 | 114.0 | 99.0 | 119.0 | 92.5 | 98.3 | 65.0 | 84.2 | 93.2 |
| Equilibrium Catalyst Properties | | | | | | | | | |
| Catalyst[1] | GXP-8S | GXP-8S | GXP-8S | GXP-8S | GXP-8S | GXP-8S | GXP-8S | GXP-8S/ HEZ-55[2] | GXP-8S/ HEZ-55[3] |
| MAT Activity | 68.7 | 69.9 | 68.4 | 66.3 | 68.0 | 67.3 | 69.4 | 67.3 | 67.9 |
| Vanadium, $ppm_w$ | 3071 | 3153 | 3793 | 3900 | 3805 | 3649 | 4309 | 4690 | 4580 |
| Nickel, $ppm_w$ | 2932 | 2068 | 2874 | 2832 | 2828 | 3209 | 2965 | 2911 | 2669 |
| Antimony, $ppm_w$ | 1348 | 840 | 1210 | 934 | 1036 | 1212 | 1017 | 1396 | 1192 |

TABLE 4B

Operating Parameters/Conditions for an FCCU Operated at the Inventive Conditions
Operating Parameters

|  | Month 1 | Month 2 | Month 3 | Month 4 | Month 5 | Month 6 | Month 7 | Month 8 | Month 9 |
|---|---|---|---|---|---|---|---|---|---|
| Catalyst Oil Ratio | 7.7 | 7.5 | 8.1 | — | 7.6 | 7.0 | 7.3 | 7.1 | 6.8 |
| Catalyst Circulation Rate, tpm | 51.8 | 52.1 | 54.3 | — | 51.4 | 46.6 | 49.4 | 50.9 | 50.2 |
| Feed Temperature, °F. | 328 | 321 | 303 | 404 | 341 | 385 | 363 | 366 | 396 |
| Riser Outlet Temperature | 994 | 992 | 993 | 992 | 992 | 986 | 984 | 984 | 986 |
| Regenerator Bed Temperature | 1306 | 1301 | 1275 | 1287 | 1289 | 1277 | 1289 | 1303 | 1307 |
| Catalyst Added, tpd | 32.8 | 25.5 | 12.7 | 29.1 | 29.0 | 22.7 | 33.2 | 36.1 | 28.3 |

[1]GXP-8S is marketed by Davidson
HEZ-55 is marketed by Englehard
[2]Addition of HEZ-55 bottom cracking catalyst began at the end of the month, catalyst was 5 wt. % HEZ-55, balance was GXP-8S.
[3]Bottoms cracking catalyst HEZ-55 increased to ~15% by end of month.

TABLE 5A

Performance Characteristics of an FCCU Operated at Inventive Conditions, Months 1–5

| | Month 1 | | Month 2 | | Month 3 | | Month 4 | | Month 5 | |
|---|---|---|---|---|---|---|---|---|---|---|
| | BBL/D | LVol % | BBL/D | LVol % | BBL/D | LVol % | BBL/D | LVol % | BBL/D | LVol % |
| Feed Rates | | | | | | | | | | |
| Fresh Feed | 58703 | 100 | 61971 | 100 | 57713 | 100 | 56578 | 100 | 60655 | 100 |
| Slurry Recycle | 2943 | 5.0 | 2266 | 3.7 | 4275 | 7.4 | 1967 | 35 | 2799 | 4.6 |
| Product Yields | | | | | | | | | | |
| Conversion | 44709 | 76.16 | 48771 | 78.70 | 45985 | 79.64 | 43574 | 77.02 | 48074 | 79.26 |
| Gasoline | 32239 | 54.92 | 34964 | 56.42 | 33294 | 57.69 | 31816 | 56.23 | 35801 | 59.02 |
| Light Cycle Oil | 8059 | 13.73 | 7219 | 11.85 | 6884 | 11.93 | 6468 | 11.43 | 8480 | 13.98 |
| $C_3$ Olefins | 4372 | 7.45 | 4649 | 7.50 | 4336 | 7.51 | 4021 | 7.11 | 4378 | 7.22 |
| $C_3$ Other | 1862 | 3.17 | 2061 | 3.33 | 1752 | 3.04 | 1577 | 2.79 | 1655 | 2.73 |
| $iC_4$ Olefins | 1351 | 2.30 | 1449 | 2.34 | 1350 | 2.34 | 1209 | 2.14 | 1331 | 2.19 |
| Other $C_4$ Olefins | 4037 | 6.88 | 4332 | 6.99 | 4026 | 6.98 | 3641 | 6.44 | 3995 | 6.59 |
| $iC_4$ | 3381 | 5.78 | 4077 | 6.58 | 3454 | 5.98 | 2919 | 5.16 | 3160 | 5.21 |
| $NC_4$ | 1357 | 2.31 | 1579 | 2.55 | 1341 | 2.32 | 1173 | 2.07 | 1219 | 2.01 |
| Heavy Cycle Oil | 3153 | 5.37 | 2932 | 4.73 | 2611 | 4.52 | 3767 | 6.66 | 1944 | 3.21 |
| Decant Oil | 2761 | 4.74 | 3050 | 4.92 | 2253 | 3.90 | 2768 | 4.89 | 2157 | 3.58 |

TABLE 5B

Performance Characteristics of an FCCU Operated at Inventive Conditions, Months 1–5

| | Month 1 | | Month 2 | | Month 3 | | Month 4 | | Month 5 | |
|---|---|---|---|---|---|---|---|---|---|---|
| | BBL/D | LVol % | BBL/D | LVol % | BBL/D | LVol % | BBL/D | LVol % | BBL/D | LVol % |
| $C_2$ and Lighter, kscfd | 18968 | | 20484 | | 17550 | | 16403 | | 16800 | |
| Coke, | | | | | | | | | | |
| lb/hr | 85932 | | 93095 | | 88821 | | 90083 | | 95622 | |
| lb/bbl conversion | | 46.1 | | 45.8 | | 46.4 | | 49.6 | | 47.8 |

TABLE 5C

Performance Characteristics of Heavy Oil Crudes Operated at Inventive Conditions, Months 6–9

| | Month 6 | | Month 7 | | Month 8 | | Month 9 | |
|---|---|---|---|---|---|---|---|---|
| | BBL/D | LVol % | BBL/D | LVol % | BBL/D | LVol % | BBL/D | LVol % |
| Feed Rates | | | | | | | | |
| Fresh Feed | 61562 | 100 | 60531 | 100 | 62579 | 100 | 61445 | 100 |
| Slurry Recycle | 1958 | 3.2 | 2335 | 3.9 | 2568 | 4.1 | 4447 | 7.2 |
| Product Yields | | | | | | | | |
| Conversion | 48041 | 78.04 | 47562 | 78.6 | 48004 | 76.7 | 48489 | 78.9 |
| Gasoline | 35676 | 57.95 | 35837 | 69.2 | 36236 | 57.9 | 36819 | 69.9 |
| Light Cycle Oil | 8691 | 14.12 | 8103 | 13.39 | 8577 | 13.71 | 9185 | 14.92 |
| $C_3$ Olefins | 4177 | 6.79 | 4701 | 7.77 | 4259 | 6.81 | 4209 | 6.86 |
| $C_3$ Other | 1549 | 2.52 | 1846 | 3.0 | 1735 | 2.8 | 1616 | 2.6 |
| $iC_4$ Olefins | 1270 | 2.06 | 1264 | 2.09 | 1245 | 1.99 | 1336 | 2.17 |
| Other $C_4$ Olefins | 3817 | 6.20 | 3800 | 6.28 | 3756 | 6.00 | 3997 | 6.61 |
| $iC_4$ | 3039 | 4.94 | 3247 | 5.36 | 3103 | 4.96 | 2883 | 4.69 |
| $NC_4$ | 1148 | 1.86 | 1225 | 2.02 | 1216 | 1.94 | 1169 | 1.90 |
| Heavy Cycle Oil | 2417 | 3.93 | 2151 | 3.56 | 2678 | 4.28 | 1201 | 1.96 |
| Decant Oil | 2413 | 3.92 | 2715 | 4.49 | 3320 | 5.31 | 2591 | 4.22 |
| $C_2$ and Lighter, kscfd | 15666 | | 16286 | | 18746 | | 19470 | |
| Coke, | | | | | | | | |
| lb/hr | 104152 | | 86814 | | 89151 | | 87878 | |
| lb/bbl conversion | | 48.0 | | 43.8 | | 44.6 | | 43.5 |

That which is claimed:

1. A feed injection cone assembly for use in a fluid catalytic cracking unit comprising
   (a) a frustoconically-shaped containing means with an centerline axis wherein the frustom end is situated below the base end and the frustom and base ends of said containing means are apertures open to flow,
   (b) a gas nozzle assembly with an inlet aperture and an outlet aperture wherein said inlet aperture is connected solely to a gas source, said outlet aperture is situated inside the frustoconically-shaped containing means and generally centered about said centerline axis and oriented for flow in the direction of the base end, and
   (c) at least two bifluid nozzle assemblies arranged radially about the centerline axis, each nozzle assembly with an inlet aperture and an outlet aperture and wherein said outlet aperture is oriented for flow toward the centerline axis in an upward manner.

2. The apparatus according to claim 1 additionally comprising a first gas supply line and an oil supply line which are attached to the inlet apertures on the bifluid nozzle assemblies and wherein said gas source is a second gas supply line which is attached to the inlet aperture on the gas nozzle assembly.

3. The apparatus according to claim 2 wherein said first and second gas supply lines are steam supply lines.

4. The apparatus according to claim 2 wherein the outlet apertures for the bifluid nozzle assemblies and the gas nozzle assembly are relative to the frustom end of said containing means at about 0.5 to 1.0 h where h is the length of the containing means and is the distance between the frustom end and the base end measured along the centerline axis of the frustoconically-shaped containing means.

5. The apparatus according to claim 2 wherein said containing means is additionally comprised of apertures through which the bifluid and gas nozzle assemblies access the interior of said containing means and said apparatus is additionally comprised of a means for affixing said bifluid and gas nozzle assemblies to said containing means.

6. The apparatus according to claim 5 wherein the outlet apertures for the bifluid nozzle assemblies and the gas nozzle assembly are situated relative to the frustom end at 0.5 to 1.0 h where h is the length of the containing means and is the distance measured along the centerline axis between the frustom end and the base end, the rate of change of diameter of the containing means with distance along the centerline axis from the frustom end is 0.10 in./in. to 0.40 in./in., the frustom diameter to base diameter ratio is 1.1 to 2.0, and wherein the gas nozzle assembly is nominally comprised of an entry line and a feed nozzle which is connected to said entry line wherein the ratios of the outside diameter of the entry line and feed nozzle to the inside diameter of the containing means at the frustom are 0.10 to 0.50 and the longitudinal axis of the entry line intersects the centerline axis of the containing means at fight angles and at 0.10 to 0.50 h measured relative to the frustom end.

7. The apparatus according to claim 6 additionally comprising a first steam supply line and an oil supply line which are attached to the inlet apertures on the bifluid nozzle assemblies and a second steam supply line which is attached to the inlet aperture on the gas nozzle assembly.

8. The apparatus according to claim 7 wherein the angular relation of neighboring bifluid nozzle assemblies relative to the centerline axis is 360 degrees divided by the number of bifluid nozzles.

9. The apparatus according to claim 8 wherein each bifluid nozzle assembly is nominally comprised of a bifluid nozzle and the longitudinal axis of said nozzle intersects the centerline axis of the containing means at 10 to 75 degrees.

10. The apparatus according to claim 9 wherein said bifluid nozzle assembly is a slotted-type nozzle.

11. The apparatus according to claim 9 wherein the angle of intersection for the longitudinal axis of said bifluid nozzle with the centerline axis of said containing means is twenty to fifty degrees.

12. The apparatus according to claim 11 wherein the angle of intersection is about thirty degrees.

13. The apparatus according to claim 12 wherein the outlet apertures for the gas nozzle assembly and the bifluid nozzle assemblies are located at similar positions relative to the frustom end as measured along the centerline axis of said containing means.

14. The apparatus according to claim 9 wherein the outlet apertures for the gas nozzle assembly and bifluid nozzle assemblies are located relative to the frustom end at about 0.7 to about 0.9 h, the ratios of the outside diameter of the entry line and gas nozzle to the frustom diameter are about 0.20 to about 0.35 and the longitudinal axis of said entry line intersects the centerline axis relative to the frustom end at about 0.12 h to about 0.32 h.

15. The apparatus according to claim 14 wherein said bifluid nozzle assembly is nominally comprised of a slotted-type nozzle.

16. The apparatus according to claim 14 wherein the outlet apertures for the gas nozzle assembly and bifluid nozzle assemblies are located at about 0.8 h measured relative to the frustom end and said diameter ratio of claim 14 is about 0.26.

17. The apparatus according to claim 16 wherein the longitudinal axis for each bifluid nozzle and the center of the outlet aperture for each nozzle assembly intersect the loci of points of a circle with a diameter which is about 0.86 the diameter of the frustoconically-shaped containing means at about 0.8 h measured relative to the frustom end.

18. The apparatus according to claim 16 wherein the angle of intersection is about 30 degrees.

19. A feed injection cone assembly for use in a catalytic cracking unit comprising
   (1) a frustoconically-shaped containing means so situated that the axis centerline is approximately vertical and wherein the frustom end is located below the base end, each end is an aperture, the rate of change of diameter with distance along the centerline axis is about 0.25 in./in. and the frustom to base diameter ratio is about 1.25;
   (2) a gas nozzle assembly comprised of an entry line with an inlet aperture connected to a steam supply line and a gas nozzle connected to said entry line and with an outlet aperture wherein said outlet aperture is situated inside the frustoconically-shaped containing memos, generally centered about the centerline axis, open to flow in the direction of the base end, and located along the centerline at about 0.80 h measured relative to the frustom end where h is the length of the containing means and is the distance measured along the centerline axis between the frustom end and the base end and wherein the ratios of the outside diameter of the entry line and gas nozzle to the frustom diameter are about 0.28 and the longitudinal axis of the entry line intersects the centerline axis at right angles at about 0.23 h measured relative to the frustom end; and
   (3) seven bifluid nozzle assemblies, each nominally comprised of a slotted-type nozzle connected to a steam supply line and an oil supply line wherein the longitudinal axis for each slotted-type nozzle and the aperture center for the outlet for each nozzle intersect the loci of points of a circle with a diameter which is about 0.86 the diameter of the frustoconically-shaped containing means at about 0.8 h measured relative to the frustom end and wherein the longitudinal axis of said nozzle intersects the centerline of said containing means at an angle of about 30 degrees.

20. The apparatus according to claim 2 additionally comprising a riser-reactor which is affixed to the base end of said frustoconically-shaped containing means.

21. The apparatus according to claim 20 additionally comprising a J-bend transfer line which is affixed to the frustom end of said frustoconically-shaped containing means.

22. The apparatus according to claim 21 wherein said J-bend transfer line is additionally comprised of apertures and aeration and fluidization injection ports which are affixed at said apertures.

23. The apparatus according to claim 22 additionally comprising a transfer line and a manipulative valve wherein the transfer line is affixed to the manipulative valve and the manipulative valve is affixed to the J-bend transfer line.

24. The apparatus according to claim 23 wherein said manipulative valve is comprised of at least one slide valve.

25. An appartus for combining oil, catalyst and gas in a catalytic cracking unit comprising:

(a) a catalyst transfer line;

(b) a slide valve affixed to said transfer line;

(c) a J-bend transfer line comprised of a first straight section, a first bend, a second straight section, a second bend and a third straight section which are sequentially affixed to one other wherein the centerline axis of the first and third sections are nearly vertical and the longitudinal axis of the second straight section corresponds to rotating a vertical line clockwise 40 to 60 degrees and said first straight section is affixed to said slide valve and said J-bend transfer line is additionally comprised of apertures and aeration and fluidization ports which have been affixed at said apertures.

(d) a feed injection cone assembly comprising
 (1) a frustoconically-shaped containing means so situated that the axis centerline is approximately vertical and wherein the frustom end is located below the base end, each end is an aperture, the rate of change of diameter with distance along the centerline axis is about 0.25, the frustom to base diameter ratio is about 1.25, the frustom end is affixed to said third straight section on the J-bend line;
 (2) a gas nozzle assembly comprised of an entry line with an inlet aperture connecting to a steam supply line and a gas nozzle with an outlet aperture and connected to said entry line wherein said outlet aperture is situated inside the frustoconically-shaped containing means, generally centered about the centerline axis, open to flow in the direction of the base end, and located along the centerline at about 0.80 h measured relative to the frustom end where h is the length of the containing means and is the distance measured along the centerline axis between the frustom end and the base end and wherein the ratios of the outside diameter of the entry line and gas nozzle to the frustom diameter are about 0.28 and the longitudinal axis of the entry line intersects the centerline axis at right angles at about 0.23 h measured relative to the frustom end; and
 (3) seven bifluid nozzle assemblies, each nominally comprised of a slotted-type nozzle connected to a steam supply line and an oil supply line wherein the longitudinal axis for each slotted-type nozzle and the aperture center for the outlet for each nozzle intersect the loci of points of a circle with a diameter which is about 0.86 the diameter of the frustoconically-shaped containing means at about 0.8 h measured relative to the frustom end and wherein the longitudinal axis of said nozzle intersects the centerline of said containing means at an angle of about 30 degrees; and (e) a riser reactor wherein the base of the riser reactor is connected to the base end of the conically-shaped containing means on the feed injection cone assembly.

26. In a fluidized catalytic cracking process for the cracking of heavy oil employing a reaction zone, a catalyst/product separation zone, a catalyst stripping zone, a catalyst regeneration zone, a catalyst conveyance zone, and a feed injection zone, the improvement comprising employing the feed injection assembly of claim 1 in the feed injection zone by flowing oil and gas into the bifluid nozzle assemblies, flowing catalyst and gas into the aperture at the frustom end of said apparatus and flowing gas into the gas nozzle assembly.

27. The process according to claim 26 wherein the weight ratio of oil to gas flowed to the bifluid nozzle assemblies is about 6:1 to about 25:1, the gas flowrate to the gas nozzle assembly is greater than 0 to about 6 weight % of the total gas flowrate to the bifluid nozzle assemblies, and the catalyst flowrate is that effective to maintain a catalyst to oil weight ratio of about 2:1 to about 20:1.

28. The process according to claim 27 wherein the weight ratio of oil to gas flowed to the bifluid nozzle assemblies is about 15:1 to about 20:1, the gas flowrate to the gas nozzle assembly is about 0.5 to about 4 wt % of the total gas flowrate the bifluid nozzle assemblies, and the catalyst flowrate is that effective to maintain a catalyst to oil weight ratio of about 2:1 to about 15:1.

29. In a fluidized catalytic cracking process for the cracking of heavy oils employing a reaction zone, a catalyst/product separation zone, a catalyst stripping zone, a catalyst regeneration zone, a catalyst conveyance zone, and a feed injection zone, the improvement comprising employing the feed injection assembly of claim 7 in the feed injection zone by flowing oil and steam into the bifluid nozzle assemblies, flowing catalyst and gas into the aperture at the frustom end of said apparatus and flowing steam into the gas nozzle assembly.

30. The process according to claim 29 wherein the weight ratio of oil to steam fed to the bifluid nozzle assemblies is about 15:1 to about 20:1, the steam flowrate to the gas nozzle assembly is about 0.5 to about 4 wt % of the total steam flowrate to the bifluid nozzle assemblies, and the catalyst flowrate is that effective to maintain a catalyst to oil weight ratio of 2:1 to 15:1.

31. In a fluidized catalytic cracking process employing a reaction zone, a catalyst/product separation zone, a catalyst stripping zone, a catalyst regeneration zone, a catalyst conveyance zone, and a feed injection zone, the improvement comprising employing the feed injection assembly of claim 10 in the feed injection zone by flowing oil and steam into the bifluid nozzle assemblies, flowing catalyst and steam into the aperture at the frustom end of said apparatus and flowing gas into the gas nozzle assembly.

32. The process according to claim 31 wherein the weight ratio of oil to steam fed to the bifluid nozzle assemblies is about 15:1 to about 20:1, the steam flowrate to the gas nozzle assembly is about 0.5 to about 4 wt % of the total steam flowrate to the bifluid nozzles, and the catalyst flowrate is that effective to maintain a catalyst to oil weight ratio of about 2:1 to about 15:1.

33. In a fluidized catalytic cracking process for the cracking of heavy oils employing a reaction zone, a catalyst/product separation zone, a catalyst stripping zone, a catalyst regeneration zone, a catalyst conveyance zone, and a feed injection zone, the improvement comprising employing the feed injection assembly of claim 19 in the feed injection zone by flowing oil and steam into the bifluid nozzle assemblies, flowing catalyst and gas into the aperture at the frustom end of said apparatus and flowing steam into the gas nozzle assembly.

34. The process according to claim 33 wherein the weight ratio of oil to steam fed to the bifluid nozzle assemblies is about 15:1 to about 20:1, the steam flowrate to the gas nozzle assembly is about 0.5 to about 4 wt % of the total steam flowrate to the bifluid nozzles, and the catalyst flowrate is that effective to maintain a catalyst to oil weight ratio of about 2:1 to about 15:1.

35. In a fluidized catalytic cracking process employing a riser reaction zone, a catalyst/product separation zone, a catalyst stripping zone, a catalyst regeneration zone, a catalyst conveyance zone, and a feed injection zone, the improvement comprising employing apparatus of claim 21 in the catalyst conveyance zone and the feed injection zone by flowing catalyst into the transfer line, gas into the aeration and fluidization ports, oil and gas into the bifluid nozzle assemblies, and gas into the gas nozzle assembly.

36. The process according to claim 35 wherein the gas flowrate to the aeration ports is that effective to maintain catalyst movement in the J-bend line, the gas flowrate to the fluidization ports is that effective to fluidize the catalyst as it enters the feed injection cone assembly, the gas flowrate to the bifluid nozzle assemblies is that sufficient to effect a weight ratio of oil to gas fed to the bifluid nozzle assemblies of about 15:1 to about 20:1, the gas flowrate to the gas nozzle assembly is about 0.5 to about 4 wt % of the total gas flowrate to the bifluid nozzle assemblies and the catalyst flowrate is that effective to maintain a catalyst to oil weight ratio of about 2:1 to about 15:1.

37. The process according to claim 36 wherein the gas employed is steam.

38. In a fluidized catalytic cracking process for the cracking of heavy oils employing a reaction zone, a catalyst/product separation zone, a catalyst stripping zone, a catalyst regeneration zone, a catalyst conveyance zone, and a feed injection zone, the improvement comprising employing apparatus of claim 25 in the catalyst conveyance zone and the feed injection zone by flowing catalyst into the transfer fine, steam into the aeration and fluidization ports, oil and steam into the bifluid nozzle assemblies, and steam into the gas nozzle assembly.

39. The process according to claim 38 wherein the gas flowrate to the aeration ports is that effective to maintain catalyst movement in the J-bend line, the gas flowrate to the fluidization ports is that effective to fluidized the catalyst as it enters the feed injection cone assembly, the steam flowrate to the bifluid nozzle assemblies is that sufficient to effect a weight ratio of oil to gas fed to the bifluid nozzle assemblies of about 15:1 to about 20:1, the steam flowrate to the gas nozzle assembly is about 0.5 to about 4 wt % of the steam flowrate to the bifluid nozzle assemblies, and the catalyst flowrate is that effective to maintain a catalyst to oil weight ratio of about 2:1 to about 15:1.

40. The process according to claim 39 wherein the gas employed for aeration and fluidization comprises steam.

41. A process for effectively mixing heavy oil, catalyst, and gas employing the feed injection assembly of claim 1 comprising flowing said heavy oil and gas into the bifluid nozzle assemblies, flowing catalyst and gas into the aperture at the frustom end of said apparatus and flowing gas into the gas nozzle assembly.

42. The process according to claim 41 wherein the weight ratio of oil to gas fed to the bifluid nozzle assemblies is about 15:1 to about 20:1, the gas flowrate to the gas nozzle assembly is about 0.5 to about 4 wt % of the total gas flowrate to the bifluid nozzle assemblies, and the flowrate of catalyst is that effective to maintain a catalyst to oil weight ratio of about 2:1 to about 15:1.

43. A process for effectively mixing heavy oil, catalyst, and steam employing the feed injection assembly of claim 25 comprising flowing catalyst into the transfer line, flowing steam into the aeration and fluidization ports, flowing said heavy oil and steam into the bifluid nozzle assemblies, and flowing steam into the gas nozzle assembly.

44. The process according to claim 43 wherein the steam flowrate to the aeration ports is that effective to maintain catalyst movement in the J-bend line, the steam flowrate to the fluidization ports is that effective to fluidized the catalyst as it enters the feed injection cone assembly, the steam flowrate to the bifluid nozzle assembly is that sufficient to effect a weight ratio of oil to steam fed to the bifluid nozzles of about 15:1 to about 20:1, the steam flowrate to the gas nozzle assembly is about 0.5 to about 4 wt % of the total steam flowrate to the bifluid nozzle assemblies, and the flowrate of catalyst is that effective to maintain a catalyst to oil weight ratio of about 2:1 to about 15:1.

45. A feed injection cone assembly for use in a fluid catalytic cracking unit comprising
 (a) a frustoconically-shaped containing means with an centerline axis wherein the frustom end is situated below the base end and the frustom and base ends of said containing means are apertures open to flow,
 (b) a gas nozzle assembly with an inlet aperture and an outlet aperture wherein one aperture is closed to flow using a blocking means and said outlet aperture is situated inside the frustoconically-shaped containing means and generally centered about said centerline axis and oriented for flow in the direction of the base end, and
 (c) at least two bifluid nozzle assemblies arranged radially about the centerline axis, each nozzle assembly with an inlet aperture and an outlet aperture and wherein said outlet aperture is oriented for flow toward the centerline axis in an upward manner.

46. A feed injection cone assembly for use in a catalystic creacking unit comprising
 (1) a frustoconically-shaped containing means so situated that the axis centerline is approximately vertical and wherein the frustom end is located below the base end, each end is an aperture, the rate of change of diameter with distance along the centerline axis is about 0.25 in./in. and the frustom to base diameter ratio is about 1.25;
 (2) a gas nozzle assembly comprised of an entry line with an inlet aperture and a gas nozzle connected to said entry line and with an outlet aperture wherein said outlet aperture is situated inside the frustoconically-shaped containing means, generally centered about the centerline axis, open to flow in the direction of the base end, and located along the centerline at about 0.80 h measured relative to the frustom end where h is the length of the containing means and is the distance measured along the centerline axis between the frustom end and the base end, wherein one of the apemares on the gas nozzle assembly is closed to flow using a blocking means, the ratios of the outside diameter of the entry line and gas nozzle to the frustom diameter are about 0.28 and the longitudinal axis of the entry line intersects the centerline axis at right angles at about 0.23 h measured relative to the frustom end; and (3) seven bifluid nozzle assemblies, each nominally comprised of a slotted-type nozzle connected to a steam supply line and an oil supply line wherein the longitudinal axis for each slotted-type nozzle and the aperture center for the outlet for each nozzle intersect the loci of points of a circle with a diameter which is about 0.86 the diameter of the frustoconically-shaped containing means at about 0.8 h where h is measured relative to the frustom end and wherein the longitudinal axis of said nozzle intersects the centerline of said containing means at an angle of about 30 degrees.

47. In a fluidized catalytic cracking process for the cracking of heavy oil employing a reaction zone, a catalyst/product separation zone, a catalyst stripping zone, a catalyst regeneration zone, a catalyst conveyance zone, and a feed injection zone, the improvement comprising employing the feed injection assembly of claim 45 in the feed injection zone by flowing oil and gas into the bifluid nozzle assemblies, flowing catalyst and gas into the aperture at the frustom end of said apparatus and flowing gas into the gas nozzle assembly.

48. The process according to claim 47 wherein the weight ratio of oil to gas flowed to the bifluid nozzle assemblies is about 15:1 to about 20:1, the gas flowrate to the gas nozzle assembly is about 0.5 to about 4 wt % of the total gas flowrate to the bifluid nozzle assemblies, and the catalyst flowrate is that effective to maintain a catalyst to oil weight ratio is about 2:1 to about 15:1.

49. In a fluidized catalytic cracking process for the cracking of heavy oils employing a reaction zone, a catalyst/product separation zone, a catalyst stripping zone, a catalyst regeneration zone, a catalyst conveyance zone, and a feed injection zone, the improvement comprising employing the feed injection assembly of claim 46 in the feed injection zone by flowing oil and steam into the bifluid nozzle assemblies, flowing catalyst and gas into the aperture at the frustom end of said apparatus and flowing steam into the gas nozzle assembly.

50. The process according to claim 49 wherein the weight ratio of oil to steam fed to the bifluid nozzle assemblies is about 15:1 to about 20:1, the steam flowrate to the gas nozzle assembly is about 0.5 to about 4 wt % of the total steam flowrate to the bifluid nozzles, and the catalyst flowrate is that effective to maintain a catalyst to oil weight ratio of about 2:1 to about 15:1.

51. A process for effectively mixing heavy oil, catalyst, and gas employing the feed injection assembly of claim 45 comprising flowing said heavy oil and gas into the bifluid nozzle assemblies, flowing catalyst and gas into the aperture at the frustom end of said apparatus and flowing gas into the gas nozzle assembly.

52. The process according to claim 51 wherein the weight ratio of oil to gas fed to the bifluid nozzle assemblies is about 15:1 to about 20:1, the gas flowrate to the gas nozzle assembly is about 0.5 to about 4 wt % of the total gas flowrate to the bifluid nozzle assemblies, and the flowrate of catalyst is that effective to maintain a catalyst to oil weight ratio of about 2:1 to about 15:1.

53. A process for effectively mixing heavy oil, catalyst, and steam employing the feed injection assembly of claim 46 comprising flowing catalyst into the transfer line, flowing steam into the aeration and fluidization ports, flowing said heavy oil and steam into the bifluid nozzle assemblies, and flowing steam into the gas nozzle assembly.

54. The process according to claim 53 wherein the steam flowrate to the aeration ports is that effective to maintain catalyst movement in the J-bend line, the steam flowrate to the fluidization ports is that effective to fluidized the catalyst as it enters the feed injection cone assembly, the steam flowrate to the bifluid nozzle assembly is that sufficient to effect a weight ratio of oil to steam fed to the bifluid nozzles of about 15:1 to about 20:1, the steam flowrate to the gas nozzle assembly is about 0.5 to about 4 wt % of the total steam flowrate to the bifluid nozzle assemblies, and the flowrate of catalyst is that effective to maintain a catalyst to oil weight ratio of about 2:1 to about 15:1.

\* \* \* \* \*

UNITED STATES PATENT AND TRADEMARK OFFICE
CERTIFICATE OF CORRECTION

PATENT NO. :    5,554,341

DATED       :   September 10, 1996

INVENTOR(S) :   Jan W. Wells, William H. Long, Jr. and William J. Vedder

It is certified that error appears in the above-indentified patent and that said Letters Patent is hereby corrected as shown below:

Column 21, claim 6, line 55, "fight" should be ---right.

Column 22, claim 22, line 53, "memos" should be ---means---.

Column 25, claim 38, line 51, "fine" should be ---line---.

Column 27, claim 46, line 3, "apemares" should be ---apertures---.

Signed and Sealed this

Ninth Day of September, 1997

Attest:

BRUCE LEHMAN

Attesting Officer    Commissioner of Patents and Trademarks